No. 887,961. PATENTED MAY 19, 1908.
B. G. PFEIFFER.
FRICTION TRANSMISSION MECHANISM.
APPLICATION FILED JULY 11, 1907.
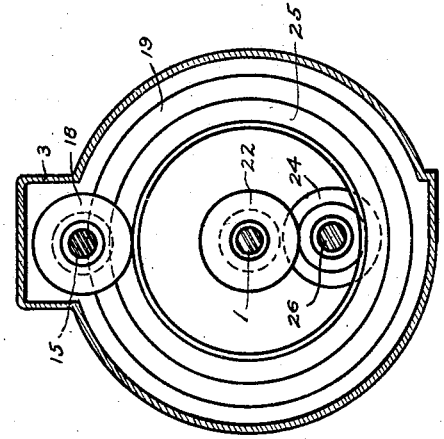
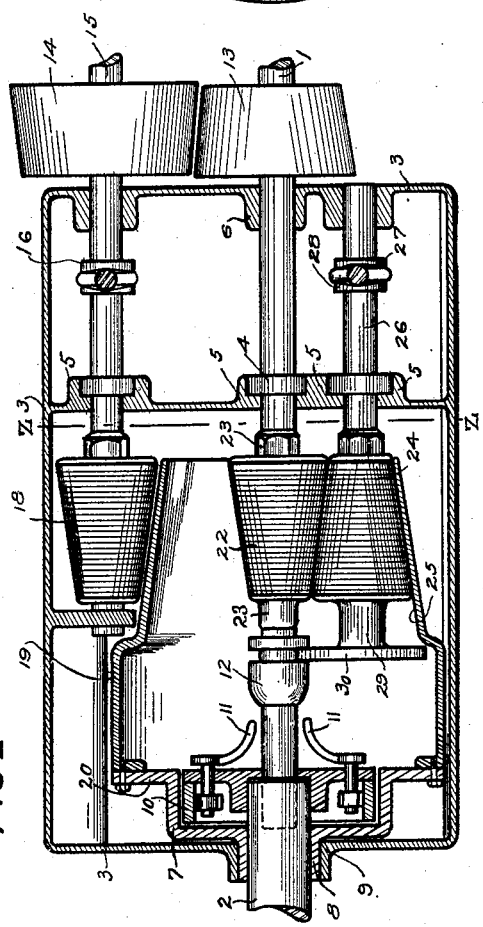
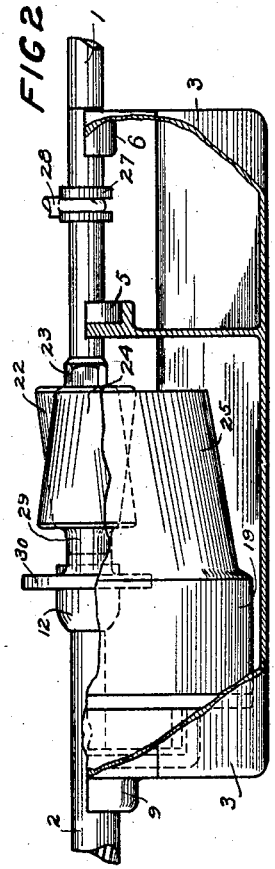
WITNESSES
Anna M. Dorr.
Anna M. Mayer
INVENTOR
BYRON G. PFEIFER.
BY
ATTORNEYS.

UNITED STATES PATENT OFFICE.

BYRON G. PFEIFFER, OF DETROIT, MICHIGAN.

FRICTION TRANSMISSION MECHANISM.

No. 887,961.     Specification of Letters Patent.     Patented May 19, 1908.

Application filed July 11, 1907. Serial No. 383,165.

*To all whom it may concern:*

Be it known that I, BYRON G. PFEIFFER, a citizen of the United States of America, residing at Detroit, in the county of Wayne and State of Michigan, have invented certain new and useful Improvements in Friction Transmission Mechanism, of which the following is a specification, reference being had therein to the accompanying drawings.

This invention relates to variable speed transmission and reversing gears, and especially to such means wherein the operative members are driven by frictional contact.

The invention consists in the matters hereinafter set forth, and more particularly pointed out in the appended claims.

In the drawings, Figure 1 is a longitudinal sectional view through a transmission mechanism which embodies the features of the invention. Fig. 2 is a side elevation with parts broken away to show the interior mechanism. Fig. 3 is a section on the line $z$—$z$, Fig. 1.

Referring to the drawings, a main drive shaft 1 and follower shaft 2 are journaled in axial alinement in bearings in a casing 3, suitably designed to carry the shafts and house the running parts. To aid in preserving the alinement the end of the follower shaft is counterbored to receive the end of the engine shaft which may run freely therein. Endwise motion of the drive shaft is prevented by a thrust collar 4 in the casing or other suitable means.

5 and 6 are bearings for the engine and countershafts.

The shafts 1 and 2 may be directly coupled to rotate as one, by a friction clutch or any design which is readily adapted to this mechanism, preferably of the internal expansion type, but whose details of construction are not, *per se*, a part of this invention. As herein shown, a clutch casing 7 is keyed or otherwise secured to the follower shaft 2, its hub 8 being rotatable in the shaft bearing 9. An internal expansion ring 10 keyed or locked on the drive shaft, is operated by cam levers 11, which in turn are moved by a collar 12 of suitable design, reciprocable on the main shaft 1. Obviously this collar may be shifted by a separate lever; preferably it is controlled through a reversing lever, as later described.

The reducing transmission between the shafts is effected through a main drive cone 13 keyed or locked on the main shaft 1 and a follower cone 14 of opposite pitch, carried by a countershaft 15. The latter is journaled in suitable bearings in the casing in parallel relation to the main shaft and may be longitudinally reciprocated in the bearings by a shift collar 16, or the like, controlled by a suitable speed changing lever, not shown. An intermediate cone 18 is secured on the inner end of the countershaft. A conoidal drum 19 is secured to the clutch ring 7, the latter being preferably provided with an integral annular flange 20, to which the drum is bolted. The drum extends well over the drive shaft, and its outer face 21 is adapted to frictionally engage the intermediate cone 18 of the countershaft, the parts being so disposed that the follower cone and intermediate cone are simultaneously in engagement with the drive cone and drum.

Reversal of the follower shaft is obtained by a main reversing cone 22 keyed or secured on the main shaft between collars 23 preventing its endwise movement. This may be frictionally engaged by an intermediate reverse cone 24 adapted to likewise bear against the inner face 25 of the drum shell. Said cone 24 is keyed or otherwise secured on an idler shaft 26 parallel to the main shaft, so that it may be longitudinally moved in its bearings by means of a shifting collar 27 on the shaft, controlled by a reversing lever 28, of the usual design. In order that this reversing lever may also operate the direct drive clutch, as hereinbefore mentioned, a stop collar 29, which prevents endwise movement of the friction cone 24, is provided with an annular flange 30 which rides in a peripheral groove in the friction clutch collar 12.

The usual lubricating means, stop collars, keys, and other like parts, not herein shown in detail, are provided. Furthermore, the drum and cones, both internal and external, are all of like pitch, so that even pressure throughout the system produces like frictional engagement.

In operation, the direct transmission is obtained by throwing in the friction clutch through proper movement of the idler shaft and collar flange by the reversing lever.

Reversal from direct drive may be obtained by complete reverse of the lever, relieving the friction clutch, and bringing the intermediate reverse cone into engagement with the main reverse cone and drum. By locking the reverse lever at mid-throw, the shafts are uncoupled, and may be again interlocked through the medium of the speed changing lever and its reducing train.

The relative proportions of the interacting members of the system determine the ratio of speed between the shafts, which may be readily fixed at any determined point.

Obviously, the design and details of construction may be varied without departing from the spirit of the invention and I do not care to limit myself to any particular form or arrangement of parts.

I claim as my invention:

1. Transmission mechanism comprising a main shaft, a follower shaft in axial alinement therewith, a friction clutch adapted to directly couple the shafts, a conical friction drum on the follower shaft concentric with the main shaft, a friction cone reduction train adapted to operatively connect the exterior face of the drum with the main shaft, a reversing friction cone train adapted to operatively connect the interior face of the drum with the main shaft, and means to throw said trains into gear.

2. Transmission mechanism comprising a main shaft, a follower shaft in axial alinement therewith, a friction clutch adapted to directly couple the shafts, a conical friction drum on the follower shaft concentric with the main shaft, a friction cone reduction train adapted to operatively connect the exterior face of the drum with the main shaft, a reversing friction cone train adapted to operatively connect the interior face of the drum with the main shaft, means to throw the reduction train into gear and means adapted to release the clutch and to throw the reversing train into engagement.

3. Transmission mechanism comprising a main shaft, a follower shaft in axial alinement therewith, a friction clutch adapted to directly couple the adjacent ends of the shafts, a conoidal drum on the follower shaft clutch member extending concentrically over the main shaft, a friction drive cone on the main shaft, intermediate, coupled friction cones outside the drum adapted to simultaneously engage the drum periphery and friction drive cone, a reverse drive cone on the main shaft within the drum, an intermediate idler cone adapted to simultaneously engage the interior face of the drum and the reverse drive cone, and means to throw said intermediate cones in and out of gear.

4. Transmission mechanism comprising a main shaft, a follower shaft in axial alinement therewith, a friction clutch adapted to directly couple the adjacent ends of the shafts, a conoidal drum on the follower shaft clutch member extending concentrically over the main shaft, a friction drive cone on the main shaft, intermediate, coupled friction cones outside the drum, adapted to simultaneously engage the drum periphery and friction drive cone, a reverse drive cone on the main shaft within the drum, an intermediate idler cone adapted to simultaneously engage the interior face of the drum and the reverse drive cone, means to throw said clutch and idler cone alternately into gear, and means to throw said coupled cones into gear.

5. Transmission mechanism comprising a main shaft, a follower shaft in axial alinement therewith, a friction clutch adapted to directly couple the shafts, a conoidal drum on the follower shaft extending over the clutch and main shaft, a main drive cone on the main shaft beyond the drum, a pair of coupled friction cones outside the drum adapted to simultaneously engage the drive cone and drum, a reverse cone on the main shaft within the drum, an idler cone within the drum adapted to simultaneously engage the inner face of the drum and the reverse pulley, means for longitudinally shifting the coupled cones, and means for longitudinally shifting the idler cone and simultaneously operating the clutch.

6. Transmission mechanism comprising a main shaft, a follower shaft in axial alinement therewith, a friction clutch whose internal ring is carried by the follower shaft and whose expansion members are carried by the main shaft, a conoidal drum secured in the clutch ring, extending concentrically over the expansion member and main shaft, a reverse friction cone of opposite pitch to the drum, secured on the main shaft within the drum, a longitudinally movable idler cone within the drum adapted to simultaneously engage the interior face of the drum and the reverse friction cone, operatively connected to the released collar of the clutch, means to longitudinally reciprocate the idler cone, and friction means adapted to couple the main shaft and exterior face of the drum.

7. A transmission mechanism comprising a main shaft, a follower shaft in axial alinement therewith, a friction clutch adapted to directly couple the main and follower shafts, a conoidal drum secured to the follower shaft, extending concentrically over the main shaft, a longitudinally reciprocable counter-shaft parallel to the main shaft, extending past the drum, a main drive friction cone secured on the main shaft without the drum, cones secured on the countershaft adapted to simultaneously engage the drum and friction cone, a reverse drive cone within the drum secured on the main shaft, a longitudinally reciprocable idler shaft parallel to the main shaft extending within the drum, an idler cone on the idler shaft adapted to simultaneously engage the reverse cone and drum, and means to reciprocate the counter and idler shaft.

8. A transmission mechanism comprising a main shaft, a follower shaft in axial alinement therewith, a friction clutch whose external casing is secured to the follower shaft and whose expansion members are secured to the main shaft, a slide collar adapted to operate the expansion members reciprocable on the main shaft, a conoidal drum secured to the follower shaft extending concentrically over the collar and main shaft, a reverse drive friction cone secured on the main shaft within the drum, a longitudinally movable idler cone adapted to simultaneously engage the drum and reverse cone, an annular flange traveling with the cone movably interlocked with the slide collar, means to longitudinally reciprocate the idler cone and flange, and an intermediate reduction train adapted to operatively connect the outer face of the drum with the main shaft.

9. Transmission mechanism comprising a casing, a main shaft journaled therein, a follower shaft journaled therein in axial alinement with the main shaft, a friction clutch whose casing is secured on the follower shaft, and whose expansion members are carried on the main shaft, a peripherally grooved collar adapted to operate the expansion members having sliding engagement with the main-shaft, a conoidal drum secured to the follower shaft, extending concentrically over the clutch collar and main shaft, a reverse friction cone secured on the main shaft within the drum, a reciprocable idler shaft journaled in the casing parallel to the main shaft, an intermediate cone on the idler shaft within the drum, adapted to simultaneously engage the drum and reverse cone, a collar fixed on the idler shaft provided with an annular flange engaging the peripheral groove of the clutch collar, means to reciprocate the idler shaft, and an intermediate forward drive reduction train adapted to frictionally couple the main shaft and outer periphery of the drum.

10. Transmission mechanism comprising a casing, a main shaft journaled therein, a follower shaft journaled therein in axial alinement with the main shaft, a friction clutch whose casing is secured on the follower shaft, and whose expansion members carried on the main shaft are operated by a peripherally grooved collar having sliding engagement with the main shaft, a conoidal drum secured to the follower shaft extending concentrically over the clutch collar and main shaft, a reverse friction cone secured on the main shaft within the drum, a reciprocable idler shaft journaled in the casing parallel to the main shaft, an intermediate cone on the idler shaft within the drum adapted to simultaneously engage the drum and reverse cone, a collar fixed on the idler shaft provided with an annular flange engaging the peripheral groove of the clutch collar, means to reciprocate the idler shaft, a longitudinally reciprocable countershaft journaled in the casing parallel to the main shaft, extending past the drum, a forward drive friction cone secured on the main shaft, a pair of similarly disposed cones secured on the countershaft adapted to simultaneously engage the outer periphery of the drum and the friction drive and means to reciprocate the countershaft.

11. Transmission mechanism comprising a casing, a main-shaft journaled therein, a follower shaft journaled therein in axial alinement with the main shaft, a friction clutch whose fixed member is on the follower shaft and whose expansion member is on the main shaft, a slide collar operating the clutch longitudinally movable on the main shaft, a conoidal friction drum secured on the fixed clutch member with its converging peripheral wall extending concentrically over the clutch, slide collar and main shaft, a friction drive cone secured on the main shaft of equal pitch to the outer drum face, a longitudinally reciprocable countershaft journaled in the casing parallel to the main shaft, a cone secured thereon abreast the drum of equal and opposite pitch thereto, a second cone secured thereon abreast the drive cone of equal and opposite pitch thereto, said countershaft cones being adapted to simultaneously engage said drum and drive cone, a lever adapted to longitudinally reciprocate the countershaft, a reverse drive cone secured on the main shaft within the drum of equal and opposite pitch to the inner face of the drum, a longitudinally movable shaft journaled in the casing in parallel relation to the main shaft whose inner end extends between the reverse drive cone and inner face of the drum, a cone on said idler shaft adapted to simultaneously engage the reverse drive cone and inner drum face, a collar secured on the idler shaft within the drum interlocking with the slide collar of the clutch, a peripherally grooved shifting collar secured on the idler shaft, and a reversing and clutch lever fulcrumed in the casing, engaging said shifting collar.

In testimony whereof I affix my signature in presence of two witnesses.

BYRON G. PFEIFFER.

Witnesses:
ANNA M. DORR,
C. K. STICKNEY.